United States Patent [19]

Kühbauch

[11] Patent Number: 4,807,325

[45] Date of Patent: Feb. 28, 1989

[54] WINDSCREEN WIPER FOR AUTOMOBILES

[75] Inventor: Gerd Kühbauch, Bühlertal, Fed. Rep. of Germany

[73] Assignee: Robert Bosch GmbH, Stuttgart, Fed. Rep. of Germany

[21] Appl. No.: 165,275

[22] PCT Filed: Feb. 26, 1987

[86] PCT No.: PCT/DE87/00071

§ 371 Date: Jan. 29, 1988

§ 102(e) Date: Jan. 29, 1988

[87] PCT Pub. No.: WO87/05269

PCT Pub. Date: Sep. 11, 1987

[30] Foreign Application Priority Data

Feb. 27, 1986 [DE] Fed. Rep. of Germany ....... 3606367

[51] Int. Cl.⁴ .............................. B60S 1/24; B60S 1/26
[52] U.S. Cl. ................................. 15/250.21; 15/250.25
[58] Field of Search ........... 15/250.21, 250.23, 250.13, 15/250.25, 250.24, 250.3

[56] References Cited

U.S. PATENT DOCUMENTS 2,516,808 7/1950 Seger ................................. 15/250.21
2,827,653 3/1958 Dyer et al. ......................... 15/250.21
3,831,220 8/1974 Gmeiner et al. .

FOREIGN PATENT DOCUMENTS 1066890 3/1960 Fed. Rep. of Germany .
2215307 3/1972 Fed. Rep. of Germany .
2430831 1/1976 Fed. Rep. of Germany .
3125628 12/1982 Fed. Rep. of Germany ... 15/250.21
3447438 5/1985 Fed. Rep. of Germany .
3427933 1/1986 Fed. Rep. of Germany .

Primary Examiner—Peter Feldman
Attorney, Agent, or Firm—Michael J. Striker

[57] ABSTRACT

A device for wiping automobile windows is proposed. The wiper has a wiper arm that is guided displaceably, by means of a thrust crank mechanism, radially to the pendulum axis on a guide element driven for pendulum motion. On its free end, the wiper arm has a wiper blade placed against the window to be wiped. The guide element has a pendulum lever protruding beyond the pendulum axis, on which lever a gear wheel the axis of rotation of which is located parallel to the pendulum axis is rotatably supported. The gear wheel cooperates with a set of teeth connected to the chassis and concentric with the pendulum axis. In order to attain a wiper step-up gear that operates quietly and is not sensitive to tolerances, the gear wheel is partly encompassed by a toothed belt having a toothed profile on both sides, one tooth profile of which, the outer one, meshes with the teeth connected to the chassis and the other, inner teeth of which mesh with the first gear wheel and the inner teeth furthermore engage a second gear wheel, which is rotatably supported on the guide element and partly encompassed by the toothed belt and is firmly connected to the crank that is part of the thrust crank mechanism.

6 Claims, 3 Drawing Sheets

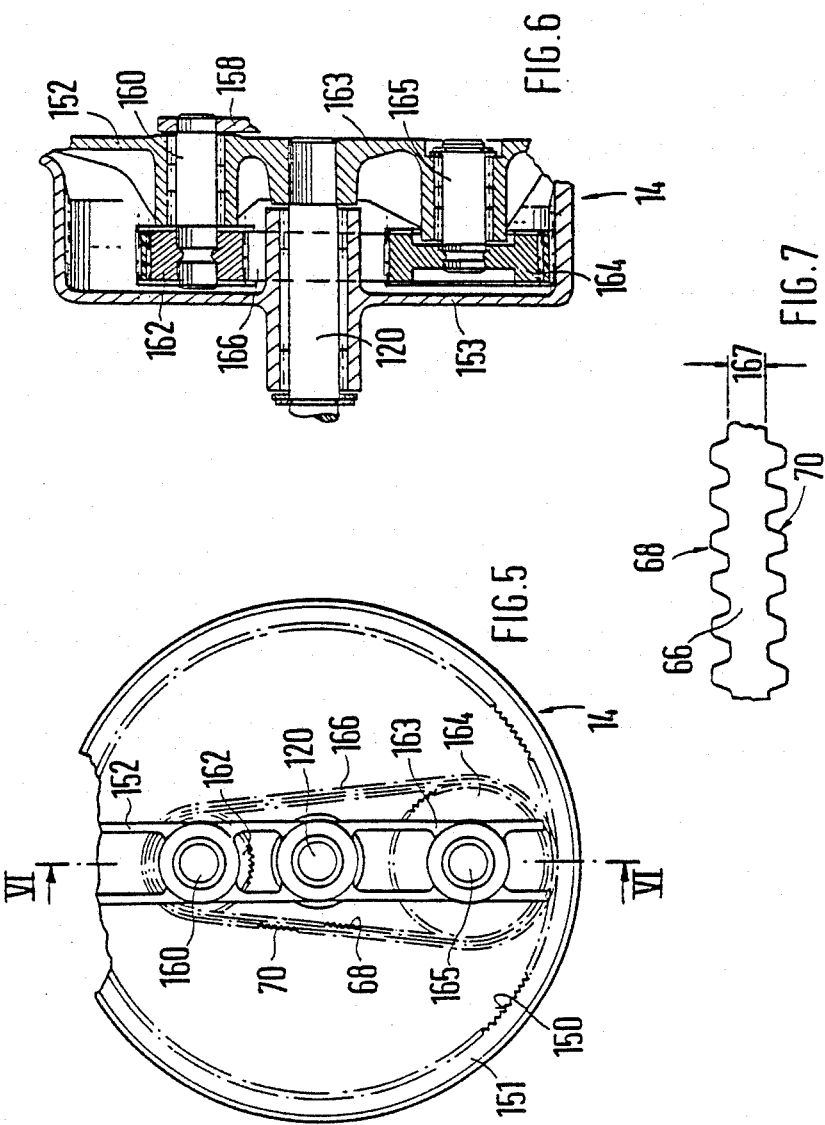

WINDSCREEN WIPER FOR AUTOMOBILES

BACKGROUND OF THE INVENTION

The invention relates to a windscreen wiper. A windscreen wiper of this kind is already known (German Pat. No. 22 15 307), in which the gear wheel is supported on the pendulum lever and meshes directly with the teeth. The crank which is part of the thrust crank mechanism is also firmly connected to this gear wheel. These two constructional criteria result in an invariable distance between the axis of rotation of the crank and of the pendulum axis, so that for each area of the windscreen to be wiped, a completely new wiper step-up gear must be designed.

It is also known to support the gear wheel fixedly in the chassis in the pendulum axis (Examined German patent application DE-AS No. 10 66 890) and to move a convexly curved rack that meshes with the gear wheel past the gear wheel. However, this windscreen wiper does not differ in terms of the principle of its construction from the known wiper device described above, and so the above-mentioned disadvantages are present here as well.

SUMMARY OF THE INVENTION

It is an object of this invention to provide a windscreen wiper which has the advantage over the prior art that the gear wheel supported on the pendulum lever has merely an intermediate wheel function, so that the transmission takes place between the second gear wheel supported on the guide element and the teeth concentric with the pendulum axis. By means of the toothed belt, the length of which is adaptable for specific customer requirements, rigid construction criteria can be relaxed, and so changes in the transmission ratio can be attained by matching the number of teeth of the second gear wheel to a corresponding adaptation in length of the toothed belt. The arrangement of the toothed belt also results in quiet, smooth operation of the wiper transmission gear.

It is particularly advantageous to dispose the teeth on the side wall of a cup-shaped housing connected to the chassis, the bottom of the housing being penetrated by a shaft driven in pendulum fashion and having the pendulum axis, because this provision produces a particularly economical gear.

The novel features which are considered as characteristic for the invention are set forth in particular in the appended claims. The invention itself, however, both as to its construction and its method of operation, together with additional objects and advantages thereof, will be best understood from the following description of specific embodiments when read is connection with the accompanying drawings.

BRIEF DESCRIPTION OF THE DRAWING

FIG. 5, a plan view on a step-up gear of the wiper, drawn realistically;

FIG. 6 is a section taken through the gear along line VI—VI of FIG. 5; and

FIG. 7 is a fragmentary view of a toothed belt of the gear of FIGS. 5 and 6.

DETAILED DESCRIPTION OF THE PREFERRED EMBODIMENT

Figure 1:
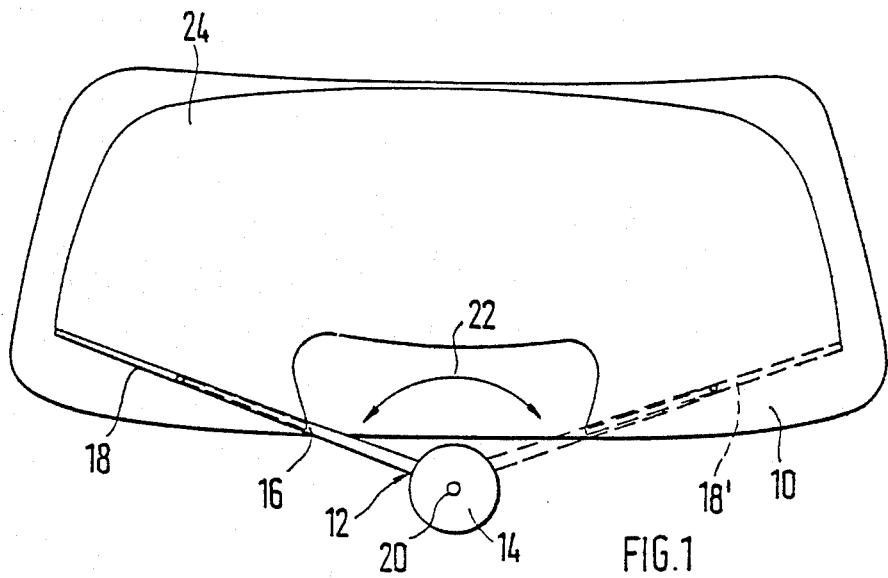
FIG. 1 is a plan view on an automobile windscreen, with a wiper associated with it.

A wiper 12 is associated with a windscreen 10 shown in FIG. 1. The wiper has a step-up gear 14, which drives a wiper arm 16 back and forth. The wiper arm, along with a wiper blade 18 secured to its free end, moves back and forth about a pendulum axis 20, which belongs to the step-up gear 14, between two return-point positions as indicated by a double arrow 22 in FIG. 1. One return-point position is represented by a solid line in FIG. 1, while the other return-point position is shown in dashed lines and marked 18'. During the back-and-forth movement, a sliding motion extending radially to the pendulum axis 20 is imparted to the wiper blade 18 resting on its wiping side 10, so that the wiping area 24 swept by the wiper blade 18 has a shape that deviates from a circular segment. Wipers operating in this way have recently come into use whenever a single windscreen wiper is intended to sweep over the maximum possible wiping area on the window to be wiped. In particular, corners of the window that are located far away from the pendulum axis are to be swept as well. Regardless of this, however, it is conceivable to use wipers functioning in this way even if an automobile window has a plurality of wipers, and in particular two wipers disposed beside one another, associated with it. The step-up gear of these two wipers is then designed such that each of the wiper blades belonging to them sweeps a wiping area that is to be considered optimal.

Figure 2:
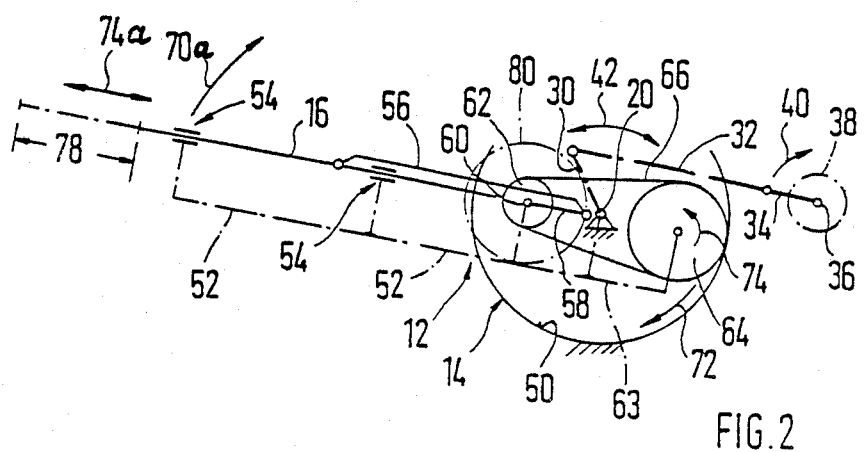
FIG. 2 is schematic view illustrating the principle of the wiper of FIG. 1, in which the wiper arm is shown in one return-point position, that shown in FIG. 1.
Figure 4:
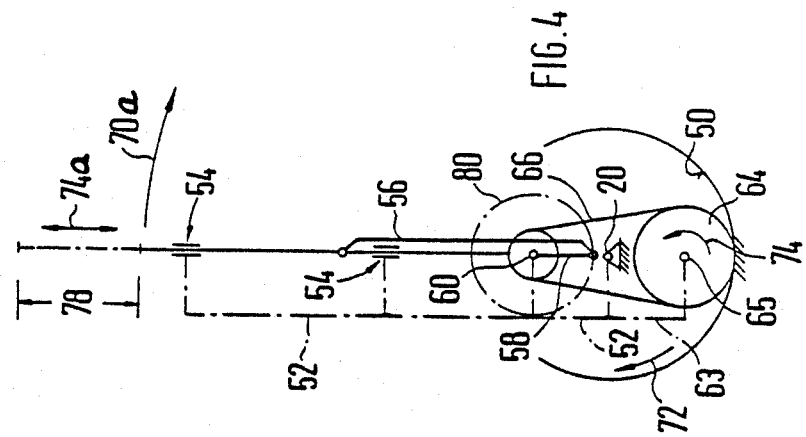
FIG. 4 shows the wiper of FIG. 2 in which the wiper arm is in still another operating position.
Figure 3:
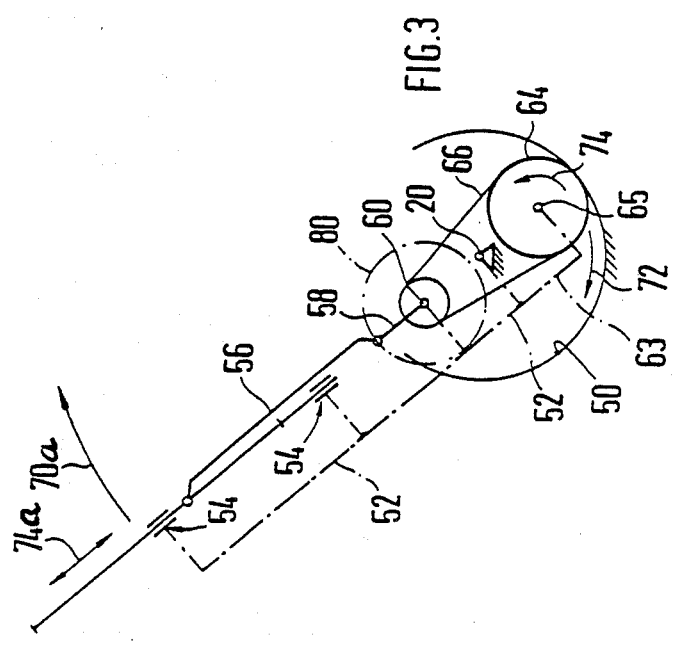
FIG. 3 shows the wiper of FIG. 2, in which the wiper arm is in another operating position.

In the schematical view of FIG. 2 illustrating the principle of the wiper 12 of FIG. 1, the wiper arm 16 is in the operating position shown in solid lines in FIG. 1. The transmission gear 14 is show in greater detail in FIG. 2. As FIG. 2 also shows, the pendulum axis 20 is embodied by a pendulum shaft supported by being attached to the chassis. A rocker lever 30 is secured to the pendulum shaft 20, and one end of a thrust rod 32 is pivotably connected to its free end. The other end of the thrust rod 32 is pivotably connected to a crank 34, which is secured on a drive shaft 36 of drive unit 38. When the drive shaft 36 of the drive unit 38 revolves in the direction of the arrow 40, the crank 34 is carried along with it, and the rocker lever 30 is set into an oscillating motion, indicated by a double arrow 42, via the thrust rod 32. The rocker 30, which is firmly connected to the pendulum shaft 20, carries the pendulum shaft 20 along with it in this motion. The pendulum angle that is operative at the pendulum shaft 20 agrees with the pivoting angle of the wiper arm 16 or wiper blade 18. The structure of the transmission gear 14 is as follows: It has teeth 50 firmly connected to the housing and concentric with the pendulum shaft 20, toward which the teeth are oriented. A guide element 52, shown in dot-dash lines in FIGS. 2–4, is secured on the pendulum shaft 20. The guide element 52 has two slide bearings 54, which relative to of the pendulum shaft 20 are disposed spaced radially from one another. The slide bearings 54 serve to receive the wiper arm 16, which is displaceable in its longitudinal direction in the slide bearings 54. One end of a thrust rod 56 is pivotably connected to the wiper arm 16, its other end being pivotably connected to a control crank 58. The control crank 58 is secured to a pivot 60 rotatably supported in the guide element 52. A pinion 62 is also firmly connected to the pivot 60. The guide element 52 is provided with a pendulum lever 63 which extends beyond the pendulum shaft 20, and a gear wheel 64, which indirectly cooperates with the teeth 50, is supported on the pendulum lever 63. The two gear wheels 62 and 64 are operatively connected with one another by means of an endless toothed belt 66, part of which is shown in FIG. 7 and which has teeth 68 and 70, respectively, on either side. Since the toothed belt 66 is embodied as an endless belt, it accordingly has one set of inner teeth and one set of outer teeth. The toothed belt 66 is placed about the two gear wheels 62 and 64 in such a way that it wraps partway around them and meshes with the teeth of the gear wheels 62 and 64. The disposition of the gear wheel 64 is selected such that the outer teeth of the toothed belt 66 meshes with the teeth 50 attached to the chassis. The axes of rotation of the gear wheels 62, 64 are parallel to the axis of the pendulum shaft 20.

The step-up ratio in the step-up gear 14 results from the number of teeth of the gear wheel or pinion 62 and the operative number of teeth in the set of teeth 50. The gear wheel 64 has no influence on the stepping-up except as an intermediate wheel, which does not determine the step-up ratio.

The operation of the wiper apparatus will now be described, referring to FIGS. 2–4. The drive of the wiper apparatus is effected by the drive device 38 such that the drive shaft 36 rotates in the direction of the arrow 40 and the wiper arm pivots out of the pendulum return-point position shown in FIG. 2 in the direction of the arrow 70a. With the operation of the drive unit 38 that now begins, the wiper arm 16 accordingly pivots in the direction of the arrow 70a, whereupon it is carried along by the guide element 52 which is firmly connected to the pendulum shaft 20. The pendulum lever 63, however, is also pivoted along with the guide element 52, in the direction of the arrow 72. In this process the gear wheel 64 rolls off on the toothed belt 66 which is in engagement with the teeth 50, the gear wheel rotating in the direction of the arrow 74. This motion is transmitted via the toothed belt 66 to the second gear wheel 62 or the pivot 60, from whence the motion reaches the thrust rod 56, via the crank 58 that is firmly connected to the pivot 60. Since the crank 58 and the thrust rod 56 form a thrust crank, a sliding motion that is directly radially outward with respect to the pendulum shaft 20 is now imparted to the wiper arm 16, this motion taking place in one direction of the double arrow 74a. The stepping-up in the gear 14 is selected such that this sliding motion comes to a stop whenever the pivot angle of the wiper arm 16 has reached a predetermined magnitude with respect to the return-point position shown in FIG. 2. This is the case, in the exemplary embodiment, once the wiper arm 16 is pointing toward the upper left end region of the window 10. In this operating position shown in FIG. 3, the crank 58 has executed a one-half revolution. The magnitude of the longitudinal displacement of the wiper arm 16 is indicated at 78 in FIG. 2. It corresponds to the diameter of the circular orbit 80 on which the link between the crank 58 and the thrust rod 56 revolves. Once a further pivoting of the wiper arm 16 has taken place (also represented by the arrow 70a in FIG. 3), the wiper arm 16 is drawn inward once again (double arrow 74a) with the aid of the thrust crank mechanism 58, 56, until it assumes the position shown in FIG. 4. In this position, the crank 58 has made one complete revolution. The wiper arm 16, or the wiper blade 18 secured to it, has been drawn by the length 78 toward the pendulum shaft, which again corresponds to the diameter of the orbit 80.

It is clear that upon further pendulum motion of the wiper arm 16 in the direction of the arrow 70a FIG. 4, the above-described courses of motion are repeated, until the wiper arm 16 and the wiper blade 18 secured to it are located in the position shown in dashed lines at 18' in FIG. 1. This is also true for the reverse pendulum motion (double arrow 22 in FIG. 1).

In FIGS. 5 and 6, the wiper step-up gear 14 is drawn more realistically. Its instantaneous operating position corresponds to the operating position shown in FIG. 4. All the components shown in schematic fashion in FIGS. 2–4 have been provided here with reference numerals that have been increased by 100 from those used in FIG. 2–4. From FIGS. 5 and 6, it is apparent that the teeth 150 concentric with the pendulum shaft 120 are disposed on the side wall of a cup-shaped housing 151 attached to the chassis. The pendulum shaft 120 penetrates the bottom 153 of the cup-shaped housing and is supported in it. It necessarily follows from what has already been said above that the housing 151, 153 be attached to the chassis. FIG. 6, in particular, also shows that the gear wheel 162 supported on the guide element 152 is seated on a pivot 160 that is rotatably supported in the guide element 152 and protrudes at both sides beyond the guide element 152. The gear wheel 162 is secured to one end of the pivot 160, while the revolving crank 158 is firmly connected to the other end of the pivot 160. The other gear wheel 164 is also secured on a pivot 165, which is rotatably supported in the pivot lever 163. The endless toothed belt 166 is wrapped around the two gear wheels 162, 164, its inner set of teeth 68 meshing with both gear wheels. The outer teeth 70 of the toothed belt 166 mesh with the teeth 150 of the housing wall 151. The disposition of the pivot 165 and hence of the gear wheel 164 is selected such that the distance between the crown circle of the teeth 150 and crown circle of the gear wheel 164 is matched to the belt thickness 167 of the toothed belt (FIG. 7).

From FIGS. 5 and 6 in particular, it clear that the positioning of the pivot 160 is variable within wide limits, and can be adapted to specific constructional requirements. The only essential factor is that the length of the toothed belt 166 be adapted to the resultant conditions. For instance, the distances between the axes of the two pivots 160, 165 can be varied. It can also prove advantageous, in response to certain requirements, for at least one of the two pivots 160 or 165 to be placed beside a radial that intersects the pendulum axis of the pendulum shaft 120 and furthermore is located in the alignment axis of the slide bearings 54 of the guide element 52 or 152.

It will be understood that each of the elements described above, or two or more together, may also find a useful application in other types of windshield wipers for automobiles differing from the types described above.

While the invention has been illustrated and described as embodied in a windshield wipers for automobiles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A windscreen wiper for automobiles, comprising a wiper arm; a guide element driven back and forth in a pendulum fashion; a thrust crank mechanism for displaceably guiding said wiper arm on said guide element radially to a pendulum axis, said wiper arm carrying on a free end thereof a wiper blade placed against a window to be wiped, said guide element including a pendulum lever protruding beyond the pendulum axis; a first gear wheel rotatably supported on said pendulum lever, an axis of rotation of said gear wheel being parallel to the pendulum axis; a chassis provided with a set of teeth positioned concentric with the pendulum axis and cooperating with said gear wheel; a second gear wheel; and a toothed belt wrapped partially about said first gear wheel (66 or 164) and partially about said second gear wheel (62 or 162) and having an inner toothed profile (68) and an outer toothed profile (70), of which the outer toothed profile meshes with said set of the teeth (50 or 150) provided on the chassis and the inner toothed profile (68) meshes with the first gear wheel (64 or 164) and also with the second gear wheel (62 or 162) rotatably supported on the guide element (52 or 152), said thrust crank mechanism including a crank (58), the second gear wheel being rigidly connected to the crank (58) of the thrust crank mechanism (56, 58).

2. A wiper as defined by claim 1, further including a pendulum shaft having said pendulum axis and driven in a pendulum motion, and a cup-shaped housing (151, 153) attached to the chassis and having a bottom and a side wall, said set of teeth being disposed on said side wall, the bottom (153) of the housing being penetrated by said shaft (20, 120).

3. A wiper as defined by claim 2, wherein the pendulum shaft (120) is supported in the bottom (153) of the housing such that it is capable of pendulum motion.

4. A wiper as defined by claim 1, wherein a shaft pivot (160) is supported in and penetrate the guide element (52 or 152), said second gear wheel being rigidly connected to one end of said shaft pivot and said crank being secured on another end of the shaft pivot (160).

5. A wiper as defined by claim 1, wherein a distance between a crown circle of the teeth (150) on said chassis and a crown circle of the first gear wheel (164) is adapted to a thickness (167) of the toothed belt (66).

6. A wiper as defined by claim 1, said wiper arm including a guide (54), wherein at least one of axes of rotation of the first and second gear wheels (62, 64 or 162, 164) is located near a radial line which, beginning at the guide (54) of the wiper arm (16), intersects the pendulum axis (20).

* * * * *